US012736997B2

(12) United States Patent
He et al.

(10) Patent No.: US 12,736,997 B2
(45) Date of Patent: Sep. 15, 2026

(54) OPTICAL COMPUTING CHIP AND SYSTEM, AND DATA PROCESSING TECHNOLOGY

(71) Applicant: Huawei Technologies Co., Ltd., Shenzhen (CN)

(72) Inventors: Jianjun He, Hangzhou (CN); Jia Guo, Hangzhou (CN); Xiaowen Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1135 days.

(21) Appl. No.: 17/582,164

(22) Filed: Jan. 24, 2022

(65) Prior Publication Data

US 2022/0147095 A1 May 12, 2022

Related U.S. Application Data

(63) Continuation of application No. PCT/CN2020/103810, filed on Jul. 23, 2020.

(30) Foreign Application Priority Data

Jul. 24, 2019 (CN) ......................... 201910673711.8
Aug. 14, 2019 (CN) ......................... 201910750038.3

(51) Int. Cl.
*G06E 3/00* (2006.01)

(52) U.S. Cl.
CPC .................................... *G06E 3/001* (2013.01)

(58) Field of Classification Search
CPC ........ G03E 3/001; G03E 3/005; G06N 3/045; G06N 3/0675; G02F 1/015; G02B 5/08;
(Continued)

(56) References Cited

U.S. PATENT DOCUMENTS 3,578,846 A 5/1971 Chen
3,752,564 A * 8/1973 Fletcher ................ G02B 27/46
359/237

(Continued)

FOREIGN PATENT DOCUMENTS

CN 109254350 A 1/2019
CN 109348317 A 2/2019

(Continued)

OTHER PUBLICATIONS

Goodman, Joseph W., A. R. Dias, and L. M. Woody. "Fully parallel, high-speed incoherent optical method for performing discrete Fourier transforms." Optics Letters 2.1 (1978): 1-3 (Year: 1978).*

(Continued)

*Primary Examiner* — Thomas K Pham
*Assistant Examiner* — Justin W. Hustoft
(74) *Attorney, Agent, or Firm* — Conley Rose, P.C.

(57) ABSTRACT

An optical computing chip includes a light source array, a first concave mirror, and a modulator array. The light source array is located on an objective focal plane of the first concave mirror. The modulator array is located on an image focal plane of the first concave mirror. The light source array generates a first optical signal based on first data. The first concave mirror outputs a first reflected optical signal based on the first optical signal. The modulator array receives the first reflected optical signal, obtains first spectrum plane distribution data based on the first reflected optical signal, and modulates the first spectrum plane distribution data onto the modulator array.

22 Claims, 8 Drawing Sheets

(58) Field of Classification Search
CPC .............. G02B 5/10; G02B 2005/1804; G02B 2006/12142; G06E 3/001; G06E 3/005
USPC ......... 359/237; 398/183, 186, 214; 385/1, 2, 385/3, 4, 5, 8, 12
See application file for complete search history.

(56) References Cited

U.S. PATENT DOCUMENTS

| | | | | |
|---|---|---|---|---|
| 5,040,859 A * | 8/1991 | White | G02F 1/015 | 359/278 |
| 5,325,388 A * | 6/1994 | Gupta | G06N 3/0675 | 372/50.1 |
| 7,262,902 B2 * | 8/2007 | Burns | G02F 1/035 | 359/321 |
| 8,164,832 B2 | 4/2012 | Ludwig | | |
| 8,316,073 B1 * | 11/2012 | Stevens | G06E 1/00 | 708/835 |
| 2017/0045909 A1 * | 2/2017 | New | G06E 3/003 | |
| 2019/0204626 A1 | 7/2019 | Watanabe et al. | | |
| 2019/0214365 A1 | 7/2019 | Gu et al. | | |

FOREIGN PATENT DOCUMENTS

| | | | |
|---|---|---|---|
| CN | 109639359 A | 4/2019 | |
| JP | 2018036486 A | 3/2018 | |
| WO | WO-2019111295 A1 * | 6/2019 | H01S 5/0265 |

OTHER PUBLICATIONS

Francis T. S. Yu, et al., “Mirror-array optical interconnected neural network,” Optics Letters, Optical Society of America, US, vol. 16, No. 20, Oct. 15, 1991, XP000231252, 3 pages.
Xiubao Sui, et al., “A Review of Optical Neural Networks,” vol. 8, Apr. 13, 2020, XP011785619, 11 pages.
Julie Chang, et al., “Hybrid optical-electronic convolutional neural networks with optimized diffractive optics for image classification,” Scientific Reports, vol. 8, No. 1, Aug. 17, 2018, XP055602493, 10 pages.
Ying Zuo, et al., et al., “All Optical Neural Network with Nonlinear Activation Functions,” Cornell University Library, Apr. 24, 2019, XP081173144, 6 pages.
Runqin Xu, et al., “A survey of approaches for implementing optical neural networks,” Optics and Laser Technology, vol. 136, Dec. 4, 2020, XP086431796, 14 pages.
Jonathan K. George et al., “Towards On-Chip Optical FFTs for Convolutional Neural Networks,” IEEE International Conference on Rebooting Computing (ICRC), 2017, 4 pages.
R. W. Cohn, Fundamental properties of spatial light modulators for the approximate optical computation of Fourier transforms: a review, Optical Engineering, Nov. 1, 2001, vol. 40, No. 11, 12 pages.
E. Cottle et al., Optical Convolutional Neural Networks—Combining Silicon Photonics and Fourier Optics for Computer Vision, Aug. 16, 2018, 11 pages.

* cited by examiner

OPTICAL COMPUTING CHIP AND SYSTEM, AND DATA PROCESSING TECHNOLOGY

CROSS-REFERENCE TO RELATED APPLICATIONS

This is a continuation of International Patent Application No. PCT/CN2020/103810 filed on Jul. 23, 2020, which claims priority to Chinese Patent Application No. 201910673711.8 filed on Jul. 24, 2019 and Chinese Patent Application No. 201910750038.3 filed on Aug. 14, 2019. The disclosures of the aforementioned applications are hereby incorporated by reference in their entireties.

TECHNICAL FIELD

This application relates to the field of computer technologies, and in particular, to an optical computing chip and system, and a data processing technology.

BACKGROUND

Due to the increase of Internet data and fast development of the artificial intelligence (AI) field, deep learning (DL) is widely applied to fields such as image recognition, speech recognition, and natural language processing. Deep learning is a neural network constructed to mimic a human brain, and can achieve a better recognition effect than conventional shallow learning. Because a deep learning algorithm is complex and has a huge amount of computation, but a conventional central processing unit (CPU) is inefficient in processing large-scale computation, research on hardware used for AI acceleration has gradually become a hot research topic.

Compared with a conventional microelectronic chip, optical computing has greatly improved performance in some applications. For example, optical computing greatly improves a computation speed in convolution computation of a neural network. Analog optical computing is a type of optical computing. Analog optical computing is an operation of using physical characteristics of optical components to complete a corresponding mathematical process. Analog optical computing is mainly based on a classical 4F system, and two modulators are used to process input data in spatial frequency domain based on a Fourier transform effect of a lens to complete corresponding computation. A convex lens used in an existing 4F system is a three-dimensional component, and therefore cannot be integrated on a chip. In addition, in the existing 4F system, an additional computing device needs to be used to first compute spectrum data of data based on Fourier transform, and then modulate the spectrum data on a modulator. An implementation process is relatively complex.

SUMMARY

This application provides an optical computing chip and system, and a data processing technology, to implement optical computing on a chip and improve data computing efficiency.

According to a first aspect, an embodiment of the present disclosure provides an optical computing chip, including a first concave mirror, a light source array, and a modulator array. The light source array is located on an objective focal plane of the first concave mirror, and the modulator array is located on an image focal plane of the first concave mirror. The light source array is configured to generate a first optical signal based on first data. The first concave mirror is configured to output a first reflected optical signal based on the first optical signal. The modulator array is configured to receive the first reflected optical signal, obtain first spectrum plane distribution data based on the first reflected optical signal, and modulate the first spectrum plane distribution data onto the modulator array.

Because the optical computing chip in this embodiment of the present disclosure uses a concave mirror, and the concave mirror is a one-dimensional component, it is easier to fabricate and integrate the concave mirror on the chip. Therefore, it is possible to implement optical computing on the chip. In addition, because a modulator in the optical computing chip can generate a photocurrent based on intensity of incident light, the first spectrum plane distribution data of the first reflected optical signal can be obtained, the spectrum plane distribution data can be directly obtained in a process of implementing optical computing, and the obtained spectrum plane distribution data is modulated onto the modulator array. In this manner, no additional computing device needs to be used to assist in obtaining spectrum plane distribution data. Further, computation efficiency is improved in the optical computation process, and the implementation is simple and efficient.

With reference to the first aspect, in another possible implementation, the light source array is further configured to generate a second optical signal based on second data. The first concave mirror is further configured to output a second reflected optical signal based on the second optical signal. The modulator array is further configured to obtain a third optical signal based on the second reflected optical signal and the first spectrum plane distribution data.

In still another possible implementation, the optical computing chip further includes a second concave mirror and a detector array. The modulator array is further located on an objective focal plane of the second concave mirror. The detector array is located on an image focal plane of the second concave mirror. The second concave mirror is configured to receive the third optical signal, and output a third reflected optical signal based on the third optical signal. The detector array is configured to detect the third reflected optical signal, where distribution of the third reflected optical signal on the detector array is used to indicate a convolution result of the first data and the second data.

According to the optical computing chip in this embodiment of the present disclosure, because the modulator array used can directly obtain optical spectrum plane distribution data based on the reflected optical signal, and can modulate the first data onto the modulator array, in a process of implementing convolution computation of the first data and the second data, no additional computing device is required to assist in obtaining spectrum plane distribution data of the first data. Therefore, computation efficiency can be improved.

In still another possible implementation, the modulator array includes a plurality of modulators, and a transmittance of each modulator for the first reflected optical signal is used to indicate a value in the first spectrum plane distribution data.

In still another possible implementation, the modulator is implemented by at least one of the following components: a doped silicon waveguide, an electroabsorption modulator, or a semiconductor optical amplifier (SOA).

In still another possible implementation, the light source array includes a plurality of light emitting elements, and each light emitting element is configured to generate incoherent light. Because light emitted by the light source array used in this embodiment of the present disclosure is incoherent light, and a data modulation function can also be considered, an input/output (I/O) speed of the optical computing chip is greatly improved in comparison with that of an existing spatial optical computing system.

In still another possible implementation, the light source array and the detector array are located on a same side of the chip. In this implementation, a structure of the optical computing chip can be made more compact, and a chip size can be reduced.

In still another possible implementation, the first concave mirror and the second concave mirror are parabolic concave mirrors.

In still another possible implementation, the light source array includes a plurality of stacked light source subarrays, the modulator array includes a plurality of stacked modulator subarrays, and the detector array includes a plurality of stacked detector subarrays. In this implementation, convolution computation can be simultaneously implemented on data in a plurality of rows and a plurality of columns.

According to a second aspect, this application provides an optical computing system, where the optical computing system includes a processor and the optical computing chip according to the first aspect or any possible implementation of the first aspect. The processor is configured to input first data to the optical computing chip.

In a possible implementation, the optical computing system further includes a light source array drive circuit and a modulator array drive circuit. The light source array drive circuit is connected to the processor and the light source array of the optical computing chip, and configured to apply a first drive signal to the light source array based on the first data. The modulator array drive circuit is connected to the modulator array, and the modulator array drive circuit is configured to sample the first spectrum plane distribution data obtained by the optical computing chip, and apply a first modulation signal to the optical computing chip based on the first spectrum plane distribution data. In this case, the light source array is further configured to generate the first optical signal based on the first drive signal. The modulator array is further configured to modulate the first spectrum plane distribution data onto the modulator array based on the first modulation signal.

In a possible implementation, the optical computing system further includes a detector array drive circuit. The detector array drive circuit is connected to the detector array of the optical computing chip. The detector array drive circuit is configured to capture the third reflected optical signal detected by the detector array, and perform analog-to-digital conversion on the third reflected optical signal to obtain the convolution result of the first data and the second data.

According to a third aspect, this application further provides a data processing method performed by the optical computing chip according to the first aspect or any implementation of the first aspect. According to the method, after the light source array in the optical computing chip generates a first optical signal based on first data, the first concave mirror in the optical computing chip outputs a first reflected optical signal based on the first optical signal, and the modulator array in the optical computing chip obtains first spectrum plane distribution data based on the first reflected optical signal, and modulates the first spectrum plane distribution data onto the modulator array.

In a possible implementation, the light source array may further generate a second optical signal based on second data. After the first concave mirror outputs a second reflected optical signal based on the second optical signal, the modulator array obtains a third optical signal based on the second reflected optical signal and the first spectrum plane distribution data. The second concave mirror in the optical computing chip outputs a third reflected optical signal based on the third optical signal. The detector array in the optical computing chip may detect the third reflected optical signal, where distribution of the third reflected optical signal on the detector array is used to indicate a convolution result of the first data and the second data.

According to a fourth aspect, this application further provides a computer program product, including program code, where instructions included in the program code are executed by a computer, to implement the data processing method according to the third aspect or any possible implementation of the third aspect.

According to a fifth aspect, this application further provides a computer-readable storage medium, where the computer-readable storage medium is configured to store program code, and instructions included in the program code are executed by a computer, to implement the data processing method according to the third aspect or any possible implementation of the third aspect.

BRIEF DESCRIPTION OF DRAWINGS

To describe the technical solutions in some of the embodiments of the present disclosure more clearly, the following briefly describes the accompanying drawings describing some of the embodiments. It is clear that the accompanying drawings in the following description show merely some embodiments of the present disclosure.

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. It is clear that the described embodiments are merely some but not all of the embodiments of the present disclosure.

An artificial neural network (ANN), referred to as a neural network (NN) or a neural-like network, is a mathematical model or a computing model that mimics a structure and function of a biological neural network (a central nervous system of an animal, and especially a brain) in the fields of machine learning and cognitive science, and is used to perform estimation or approximation on a function. The artificial neural network may include neural networks such as a convolutional neural network (CNN), a deep neural network (DNN), and a multilayer perceptron (MLP). An algorithm of a neural network system is complex and an amount of computation is huge. Therefore, a very high requirement is posed on data computation efficiency. To improve computation efficiency, optical computing that uses physical characteristics of optical components to complete a corresponding mathematical operation process is applied.

Figure 1:
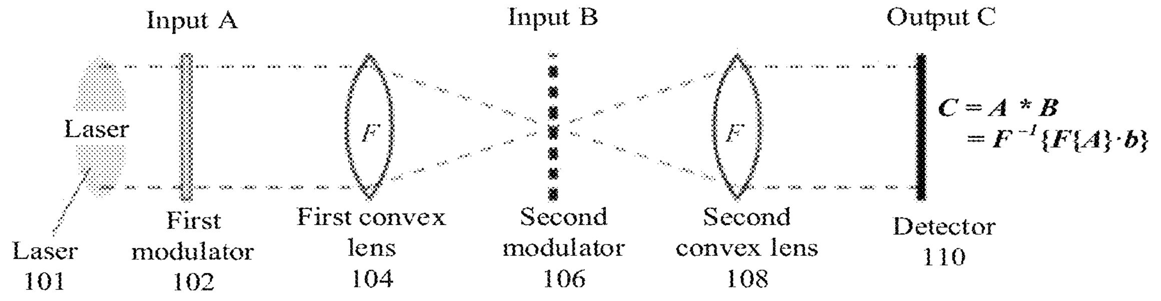
FIG. 1 is a schematic diagram of convolution computation implemented by using a 4F optical computing system according to an embodiment of the present disclosure.

The following first uses a 4F optical computing system 100 shown in FIG. 1 as an example to briefly describe a process of implementing convolution computation in a neural network system by using the optical computing system. For ease of description, in an embodiment of the present disclosure, the 4F optical computing system may also be referred to as a 4F system. The 4F system is a system including two convex lenses, two light modulators, and one detector. As shown in FIG. 1, a first modulator 102 is located at an object focal point of a first convex lens 104. A second modulator 106 is located at an image focal point of the first convex lens 104, and is located at an object focal point of a second convex lens 108. A spacing between the first convex lens 104 and the second convex lens 108 is a sum of focal lengths of the two convex lenses (104 and 108). A detector 110 is located at an image focal point of the second convex lens 108, and a length of the entire system is four times the focal length. The following describes a principle of implementing optical computing in the 4F system in FIG. 1 by using an example in which the 4F system shown in FIG. 1 performs convolution computation of the neural network system on data A and data B.

As shown in FIG. 1, in a process of performing a convolution computation between the data A and the data B, first, the data A needs to be modulated onto the first modulator 102, and a Fourier spectrum of the data B needs to be modulated onto the second modulator 106. After a laser beam emitted by a laser 101 passes through the first modulator 102, an optical signal passing through the first modulator 102 is an optical signal generated based on the data A. After Fourier transform is performed on the optical signal through the first convex lens 104, a spatial frequency domain image is presented on the second modulator 106, so that a multiplication operation between the data A and the convolutional data B previously modulated onto the second modulator 106 is completed. Inverse Fourier transform is performed on a signal output by the second modulator 106 through the second convex lens 108. Finally, the detector 110 detects light intensity of the optical signal output by the second convex lens 108, to obtain a convolution result C of the data A and the data B. It can be learned from the process of implementing convolution computation in the 4F system shown in FIG. 1 that, in the entire convolution computation process, modulation of the data B onto the second modulator 106 needs to consume extra time, and other computation processes do not consume time. Therefore, a computation speed is very high. In addition, because the spatial light modulator is a two-dimensional component, I/O concurrency of the system is high, a quantity of components in the entire system is small, and a result is relatively simple.

However, the convex lens used in the 4F system shown in FIG. 1 is a three-dimensional component and cannot be integrated on a two-dimensional plane. Therefore, the 4F system shown in FIG. 1 cannot be integrated on a chip. In addition, because the 4F system shown in FIG. 1 uses a single light source and emits coherent light, two modulators are required in the computation process, so that two pieces of to-be-computed data are modulated onto the two modulators in the computation process respectively. In addition, because the modulator in the existing 4F system cannot generate a photocurrent based on an optical signal, and does not have a function of recording spectrum plane distribution data, two modulators are required in the computation process. In addition, an additional computing device needs to be used to first compute spectrum data of the data B based on the Fourier transform, and then modulate the spectrum data of the data B onto the second modulator 106. An implementation process is relatively complex.

Figure 2:
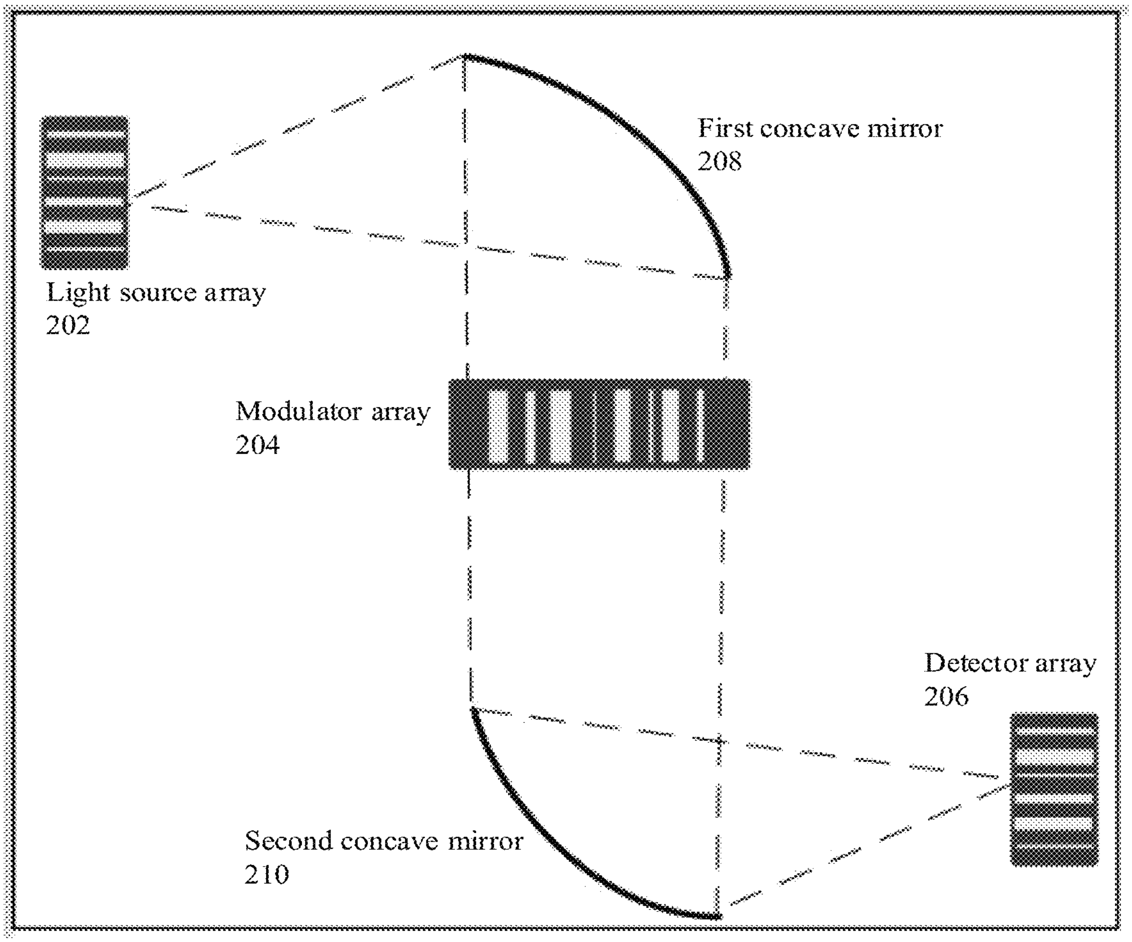
FIG. 2 is a schematic structural diagram of an optical computing chip according to an embodiment of the present disclosure.

FIG. 2 is a schematic structural diagram of an optical computing chip according to an embodiment of the present disclosure. FIG. 2 shows an on-chip optical computing system. As shown in FIG. 2, the optical computing chip 200 may include a light source array 202, a modulator array 204, a detector array 206, a first concave mirror 208, and a second concave mirror 210. The light source array 202 is located on an objective focal plane of the first concave mirror 208. The modulator array 204 is located on an image focal plane of the first concave mirror 208, and the modulator array 204 is also located on an objective focal plane of the second concave mirror 210. The detector array 206 is located on an image focal plane of the second concave mirror 210.

The light source array 202 is configured to modulate and send data, and used as a data input unit of the optical computing chip 200. The light source array 202 may generate a plurality of optical signals of different light intensity based on the input data. The first concave mirror 208 is configured to implement standard Fourier transform on an optical signal of the data sent by the light source array 202. The modulator array 204 has two working modes: a recording mode and a modulation mode. The recording mode is used to obtain an image on a spectrum plane presented after the optical signal of the data sent by the light source array 202 passes through the first concave mirror 208. The modulation mode is used to modulate, onto the modulator array 204, the image that is on the spectrum plane and that is of the optical signal of the data sent by the light source array 202. The second concave mirror 210 is configured to implement standard inverse Fourier transform on the optical signal that passes through the modulator array 204. The detector array 206 is configured to detect a light intensity signal, and is used as a result output unit of the optical computing chip 200. The following describes in detail specific implementation of each component in the optical computing chip 200.

Figure 3:
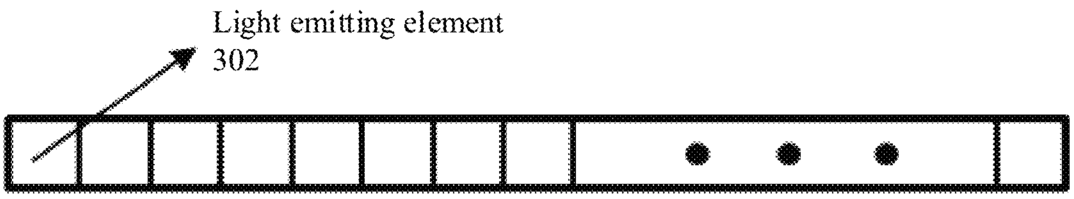
FIG. 3 is a schematic structural diagram of a light source array according to an embodiment of the present disclosure.

In an actual application, the light source array 202 may include a plurality of light emitting elements 302, and the plurality of light emitting elements may be arranged along a straight line. Intensity of light emitted by each of the light emitting elements may be modulated. Distribution of luminous intensity of the light source array along a straight line corresponds to data that needs to be input to the optical computing chip. As shown in FIG. 3, the light source array 202 may include a plurality of light emitting elements 302 arranged along a straight line. The light emitting element 302 is configured to generate incoherent light under the action of a voltage. Intensity of light emitted by the light emitting element 302 may vary with the change of the voltage. The light emitted by the light emitting element 302 may be modulated. In a case, the light source array 202 may be implemented by a semiconductor light-emitting diode (LED) array. In this case, the light emitting element 302 may be an LED. Each LED can emit incoherent light with a large divergence angle, and its luminous intensity varies with the change of the injection voltage, so that modulation can be implemented. When an LED is used as a signal input source, an amplitude of light emitted by the LED may represent to-be-computed data. For a set of to-be-computed data $f(x_k)$, a light amplitude of a $k^{th}$ LED is set to:

$$E_k(x) - f(x_k).$$

Because the LEDs are independent of each other, an emission light source may be considered as superposition of a plurality of light sources. For a single LED, a light field of light emitted by the LED may be approximately a Gaussian function. Finally, light intensity I(x) of the light emitted by the light source array 202 on an object plane is a result of superposition of all the LED light sources, that is:

$$I(x) = \sum_{k=1}^{n} |E_k(x) f(x_k)|^2,$$

where x is used to indicate computation of a data vector, n is a total quantity of LEDs on the light source array 202, a value of k ranges from 1 to n, and $E_k(x)$ is used to indicate a light amplitude of an optical signal emitted by the $k^{th}$ LED.

In another case, the light source array 202 may also be implemented by using a laser array. In this case, the light emitting element 302 may be a laser. A lens with a divergence angle may be disposed in front of each laser, so that each laser can emit light with a large divergence angle. In addition, modulation of the light intensity can also be implemented by adding a material with a variable transmittance in front of the laser. It may be understood that in an actual application, using a laser as a light emitting element may be equivalent to an effect of using an LED as a light emitting element, but an implementation process is relatively complex.

It should be noted that in comparison with a single laser emitting coherent light in FIG. 1, the light source array 202 in this embodiment of the present disclosure uses a plurality of light sources and emits incoherent light. Because intensity of each light source in the light source array may be changed, a plurality of optical signals of different light intensity can be emitted based on different values in the data without using an additional modulator, and an optical signal generation speed is higher.

The modulator array 204 has two working modes: the recording mode and the modulation mode. The recording mode is used to obtain the image on the spectrum plane obtained after the optical signal of the data sent by the light source array 202 passes through the first concave mirror 208. The modulation mode is used to modulate, onto the modulator array 204, the image that is on the spectrum plane and that is of the optical signal of the data sent by the light source array 202. The modulator array 204 may include a plurality of modulators. For example, the plurality of modulators may be arranged along a straight line to obtain the modulator array 204. In this embodiment of the present disclosure, each modulator in the modulator array 204 may record and modulate intensity of received incident light. To implement recording and modulation of incident light intensity, the modulator may be implemented by using a structure based on different principles such as a doped silicon waveguide, an electroabsorption modulator, and an SOA.

For example, when an SOA is used as a modulator, incident light intensity may be recorded by detecting a magnitude of an incident photocurrent of the SOA. In addition, intensity of an optical signal passing through the SOA may be changed by changing a light transmittance. In an actual application, the SOA may be made of a semiconductor quantum well material. Because the light transmittance of the SOA may vary with different voltages, the light transmittance of the SOA may be changed between 0 and 1 through voltage control. Further, in a state in which a voltage passing through the SOA is a reversed bias voltage, a photocurrent is generated in the SOA based on incident light, so that light intensity distribution may be obtained by detecting a magnitude of the photocurrent. In the present disclosure, spectrum distribution data after Fourier transform is performed on an object plane signal of the first concave mirror 208 may be directly obtained by detecting the light intensity distribution on the modulator array in this manner. In this way, the recording function of the modulator is implemented. As the injection voltage changes, an incident light transmittance of the SOA also changes. In this embodiment of the present disclosure, optical spatial spectrum plane data may also be modulated by using the change of the incident light transmittance of the SOA. For example, different voltages (or modulation signals) may be input to corresponding modulators based on values in the obtained spatial spectrum plane data, where a light transmittance of one modulator in the modulator array may reflect a value in the spectrum plane data. Therefore, the spectrum plane data can be modulated onto the modulator array in this manner, to implement the modulation function of the modulator array.

It may be understood that in an actual application, the SOA under the action of a forward voltage may implement the function of recording light intensity, and the SOA under the action of a reversed bias voltage may also implement the function of modulating light intensity. In this embodiment of the present disclosure, a material and an operating voltage of the modulator array 204 are not limited, provided that the modulator array 204 can implement two functions: recording and modulation. In other words, in this embodiment of the present disclosure, the modulator array 204 needs to generate a photocurrent after receiving the incident light, so that the light intensity distribution of the incident light is obtained by detecting a magnitude of the photocurrent, to implement recording of the light intensity. In addition, the modulator array 204 can change the light transmittance according to the change of the applied voltage, to modulate the light intensity.

The detector array 206 is configured to detect light intensity of the incident light, and used as a result output unit of the optical computing chip 200. In an actual application, the detector array 206 may be implemented by using a semiconductor photodiode (PD) array, a photoconductive detector array (for example, a photoresistor array), or the like.

As described above, the first concave mirror 208 is configured to implement standard Fourier transform on the optical signal of the data sent by the light source array 202. The second concave mirror 210 is configured to implement standard inverse Fourier transform on the optical signal that passes through the modulator array 204. A person skilled in the art knows that in a conventional 4F system, Fourier transform is implemented by using a convex lens. In the optical computing chip provided in this embodiment of the present disclosure, a concave reflective mirror is used to implement Fourier transform and inverse Fourier transform. The following briefly describes principles of implementing Fourier transform and inverse Fourier transform by a concave mirror.

Figure 4:
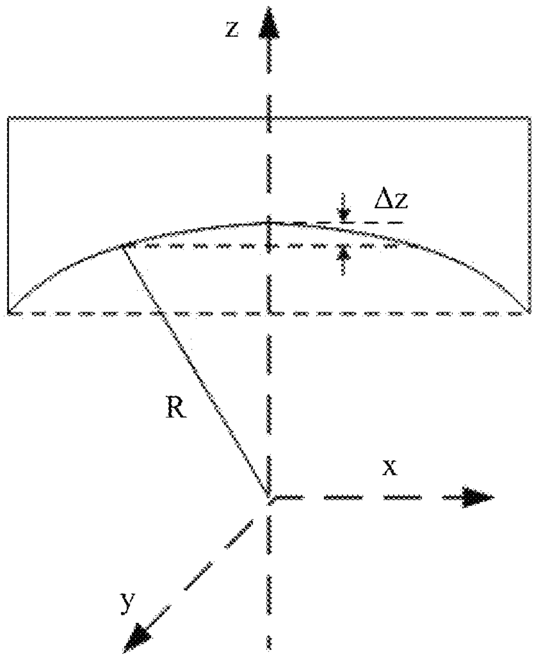
FIG. 4 is a schematic diagram of an optical path of a spherical concave mirror according to an embodiment of the present disclosure.

FIG. 4 is a schematic diagram of an optical path of a spherical reflective concave mirror according to an embodiment of the present disclosure. A person skilled in the art may know that for a reflective lens, a phase delay generated after incident light is reflected is basically caused by geometry of the reflective mirror. As shown in the figure, when the concave mirror is spherical, an equation of a reflective surface of the concave mirror is:

$$z=\sqrt{R^2-x^2-y^2},$$

where R is a radius of a circle. For incident light perpendicular to an optical axis, an optical path difference from light propagating along the optical axis is:

$$\Delta z=R-\sqrt{x^2+y^2}\approx\frac{x^2+y^2}{2R}.$$

For paraxial light, assuming R>>x, y:

$$\Delta z=R-\sqrt{x^2+y^2}\approx\frac{x^2+y^2}{2R}.$$

A total phase delay that occurs at a point (x, y) after spherical reflection may be expressed as:

$$\xi=2k\Delta z=\frac{k(x^2+y^2)}{R}.$$

In this way, a phase reflection function generated after reflection by the concave mirror has the same form as a phase transmission function of the convex lens, that is:

$$r(x,y)=\exp\left(-ik\frac{x^2+y^2}{R}\right).$$

Therefore, the concave reflective mirror can also implement Fourier transform on the incident light, and a corresponding focal length is R/2.

In an actual application, because space of the chip is limited, a size of the spherical concave mirror relative to the light source array 202 cannot meet a requirement of paraxial light, and a relatively large error is generated in a Fourier transform result. In this embodiment of the present disclosure, to reduce a computation error, a parabolic concave reflective mirror may be used to replace the spherical concave reflective mirror. For a schematic diagram of an optical path of a parabolic reflective surface, refer to the schematic diagram of the optical path of the spherical concave reflective mirror shown in FIG. 4. Details are not described herein again.

When the parabolic concave reflective mirror is used, it is assumed that a y-axis is an optical axis, p is a constant related to a parabolic focal point, and $Z_0$ is coordinates of a parabolic vertex. A parabola function is set to:

$$z=\frac{z_0-x^2-y^2}{2p}.$$

For incident light parallel to the optical axis, a phase change function of the light may be obtained by performing an analysis process same as that of the spherical mirror above, and the phase change function is:

$$r(x,y)=\exp\left(-ik\frac{x^2+y^2}{p}\right).$$

Therefore, the parabolic concave reflective mirror also has the same function as the convex lens, and can implement Fourier transform on incident light, and a corresponding focal length of the parabolic concave reflective mirror is p/2. In an actual application, a size of a parabolic surface of a parabolic concave reflective mirror may be determined based on a ratio of a size of a light source to a size of the concave mirror.

The foregoing briefly describes a principle of using a concave mirror to implement Fourier transform in this embodiment of the present disclosure. It should be noted that the present disclosure is not limited to using a parabolic concave mirror. In some cases, if the light emitted by the light source array 202 can satisfy the requirement on the paraxial light of the spherical concave mirror, the spherical concave mirror may also be used.

In an actual application, in a process of manufacturing the chip, reflective surfaces of both the first concave mirror 208 and the second concave mirror 210 may form air reflective surfaces by using a deep etching process. To reduce a loss, an end face may also be plated with a highly reflective film. Another advantage of forming a reflective surface by etching is that an arbitrary surface can be precisely defined, so that the foregoing parabolic concave mirror can be fabricated to achieve a more accurate Fourier transform effect.

Figure 5:
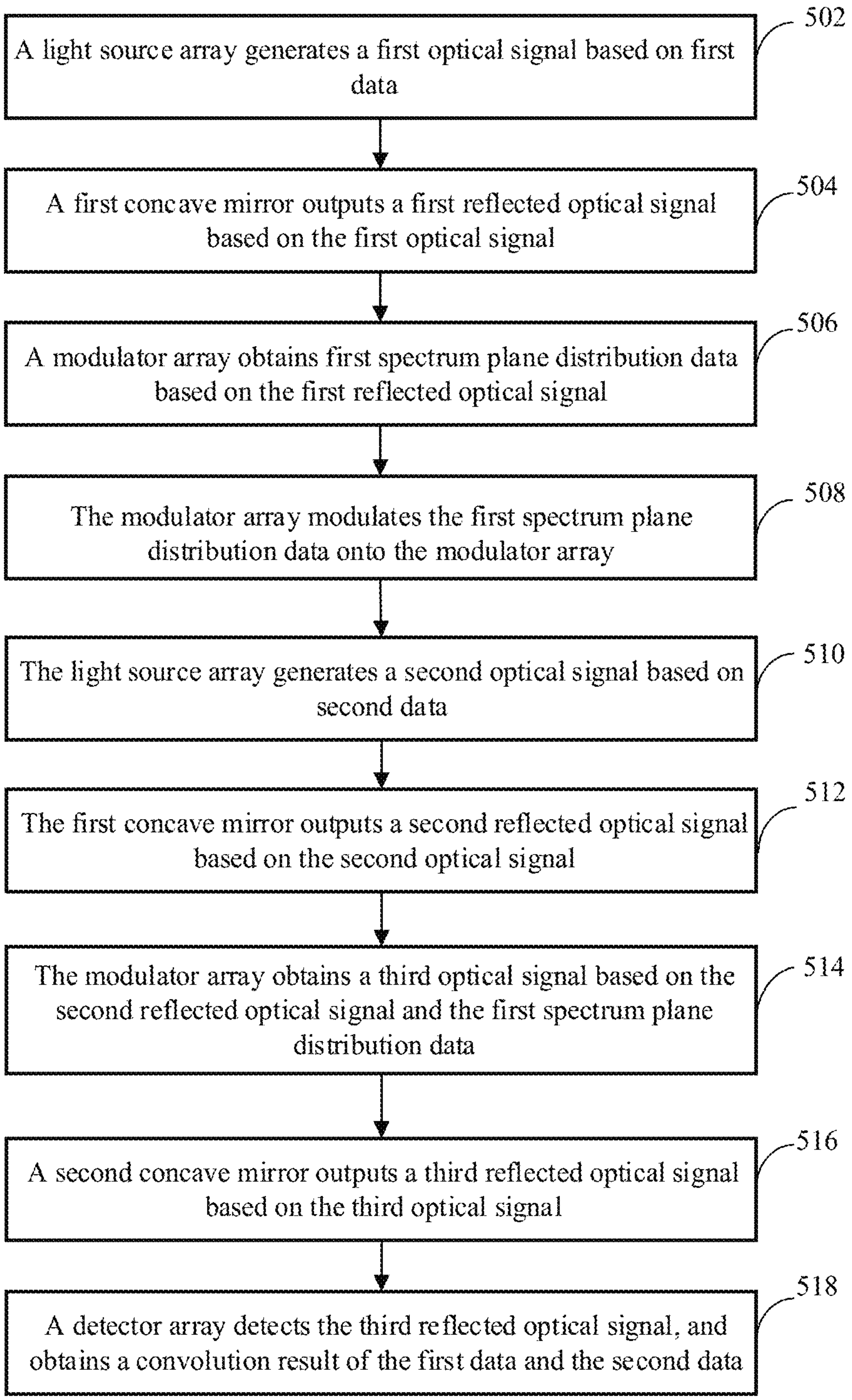
FIG. 5 is a flowchart of a method for implementing convolution computation of data by using an optical computing chip according to an embodiment of the present disclosure.

With reference to FIG. 5, the following describes in detail a data processing procedure performed by the optical computing chip shown in FIG. 2. FIG. 5 is a flowchart of a method for implementing convolution computation of data by using an optical computing chip according to an embodiment of the present disclosure. The following uses an example in which a convolution computation is implemented on first data and second data to describe how the computing chip implements the convolution computation. It may be understood that both the first data and the second data may include a plurality of real numbers. As shown in FIG. 5, the method includes the following steps.

In step 502, the light source array 202 generates a first optical signal based on the first data. As described above, the light emitting elements 302 in the light source array 202 may generate optical signals of different light intensity based on changes of voltages. In this step, voltages of different magnitudes may be input to different light emitting elements 302 in the light source array 202 based on values in the first data, so that the light emitting elements 302 in the light source array 202 emit incoherent light of different light intensity based on different values, to obtain the first optical signal. In this embodiment of the present disclosure, the first optical signal includes incoherent light emitted by the different light emitting elements 302 in the light source array 202.

In step 504, the first concave mirror 208 outputs a first reflected optical signal based on the first optical signal. As described above, in this embodiment of the present disclosure, the light source array 202 is located at a focal point on an object plane of the first concave mirror 208, the first concave mirror 208 may receive paraxial light emitted by the light source array 202, and the first reflected optical signal is output after the first optical signal is reflected by the first concave mirror 208.

In step 506, the modulator array 204 obtains first spectrum plane distribution data based on the first reflected optical signal. In this step, the modulator array 204 needs to work in a recording mode. As described above, the modulators in the modulator array 204 are made of materials that enable the modulators to generate a photocurrent upon receiving incident light. Therefore, after the modulator array 204 receives the first reflected optical signal, the modulator generates a photocurrent based on the received first reflected optical signal without applying a voltage to the modulator array 204. In this case, the first reflected optical signal can be recorded in an electrical form by detecting photocurrent intensity in the modulator, so that optical spatial spectrum plane distribution data of the first reflected optical signal is obtained. In this embodiment of the present disclosure, the spectrum plane distribution data of the first reflected optical signal may also be referred to as first spectrum plane distribution data.

In step 508, the modulator array 204 modulates the first spectrum plane distribution data onto the modulator array. In this step, the modulator array 204 needs to work in a modulation mode. Further, different voltages may be applied to the modulators based on different data recorded by the modulators in the modulator array 204, and the spectrum plane distribution data of the first reflected optical signal obtained in step 506 is modulated as a transmittance of the modulators in the modulator array 204, and the first spectrum plane distribution data is represented on the modulators. It may be understood that different voltages are applied to different data, so that different voltages are applied to different modulators in the modulator array 204.

In step 510, the light source array 202 generates a second optical signal based on the second data. In this embodiment of the present disclosure, after the first data is recorded and modulated onto the modulator array 204 by performing step 502 to step 508, the light source array 202 may generate the second optical signal based on the second data. Further, voltages of different magnitudes may be input to different light emitting elements 302 in the light source array 202 based on values in the second data, so that the light emitting elements 302 in the light source array 202 emit incoherent light of different light intensity based on different values, to obtain the second optical signal.

In step 512, the first concave mirror 208 outputs a second reflected optical signal based on the second optical signal. In step 514, the modulator array 204 obtains a third optical signal based on the second reflected optical signal and the recorded first spectrum plane distribution data. As described above, because the first spectrum plane distribution data of the first reflected optical signal obtained based on the first data has been modulated onto the modulator array 204, the first spectrum plane distribution data is represented as the light transmittance of the modulators in the modulator array 204. When the modulator array 204 receives the second reflected optical signal, after the second reflected optical signal passes through the modulators in the modulator array 204, the third optical signal may be obtained based on the second reflected optical signal together with the first spectrum plane distribution data modulated onto the modulator array 204. In this manner, the modulator array 204 completes an optical spatial spectrum plane multiplication operation on spectrum plane distribution data of the second reflected optical signal and the spectrum plane distribution data of the first reflected optical signal. In other words, the third optical signal represents an optical signal obtained after the first reflected optical signal and the second reflected optical signal pass through the modulator array 204, and the third optical signal represents a result of a multiplication operation on the first spectrum plane distribution data and the spectrum plane distribution data of the second reflected optical signal in optical spatial frequency domain. In this embodiment of the present disclosure, the spectrum plane distribution data of the second reflected optical signal may also be referred to as second spectrum plane distribution data.

In step 516, the second concave mirror 210 outputs a third reflected optical signal based on the third optical signal. As described above, the first concave mirror 208 and the second concave mirror 210 may perform Fourier transform and inverse Fourier transform. As described above, Fourier transform is performed on both the first data and the second data after the first data and the second data pass through the first concave mirror. In this step, after receiving the third optical signal output by the modulator array 204, the second concave mirror 210 outputs the third reflected optical signal, where the third reflected optical signal is a result obtained by performing inverse Fourier transform on a convolution computation result output by the modulator array 204.

In step 518, the detector array 206 detects the third reflected optical signal. Distribution of the third reflected optical signal on the detector array is used to indicate a convolution result of the first data and the second data. As described above, the detectors in the detector array 206 may detect intensity of incident light. Therefore, the convolution computation result of the first data and the second data obtained through the inverse Fourier transform may be obtained based on the detected light intensity of the third reflected optical signal.

Figure 6:
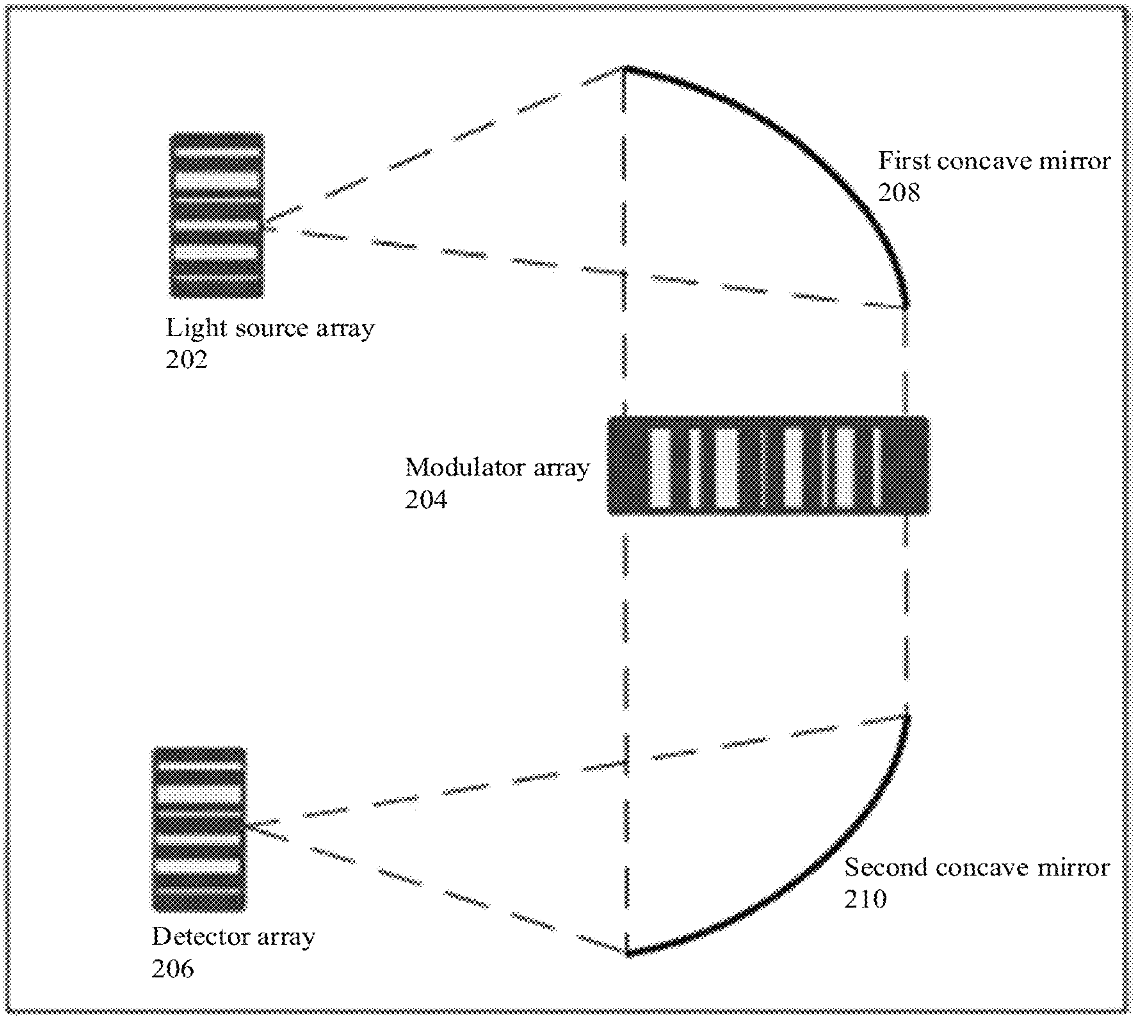
FIG. 6 is a schematic structural diagram of another optical computing chip according to an embodiment of the present disclosure.

FIG. 6 is a schematic structural diagram of another optical computing chip according to an embodiment of the present disclosure. A difference from the on-chip integrated optical computing chip provided in FIG. 2 lies in that, in the optical computing chip shown in FIG. 6, the light source array 202 and the detector array 206 are disposed on a same side of the chip. Therefore, a structure of the entire computing chip is more compact, and a chip size can be reduced. As shown in FIG. 6, in comparison with the optical computing chip shown in FIG. 2, in the optical computing chip in this embodiment of the present disclosure, positions of the first concave mirror 208, the second concave mirror 210, and the modulator array 204 remain unchanged, and positions of the light source array 202, the modulator array 204, and the detector array 206 relative to focal points of the first concave mirror 208 and the second concave mirror 210 also remain unchanged respectively. For implementation of each component shown in FIG. 6, refer to descriptions of each component in the optical computing chip shown in FIG. 2. For a process in which the computing chip shown in FIG. 6 implements convolution computation of data, refer to descriptions of FIG. 2 and FIG. 5. Details are not described herein again.

Because the optical computing chip provided in this embodiment of the present disclosure uses a concave mirror, and the concave mirror is a one-dimensional component, it is easy to fabricate and integrate the concave mirror on the chip. Therefore, it is possible to implement optical computing on the chip. In addition, because a modulator in the optical computing chip can generate a photocurrent based on intensity of incident light, the intensity of the received incident light can be recorded and modulated, and data can be directly recorded and modulated onto the modulator array in a process of implementing optical computing. No additional computing device needs to be used to assist in obtaining spectrum plane data. Therefore, computation efficiency is improved, and the implementation is simple and efficient.

Further, light emitted by the light source array used in this embodiment of the present disclosure is incoherent light, and a data modulation function can also be considered. Therefore, an I/O speed of the optical computing chip is greatly improved in comparison with that of an existing spatial optical computing system. Moreover, because the concave mirror is used to replace a convex lens in a conventional 4F system, it is easier to fabricate and integrate the concave mirror on the chip. Because all components can be integrated on the chip, in comparison with the existing 4F optical computing system, optical computing chip has a smaller size and higher flexibility, and requires lower fabrication costs. Further, in comparison with the existing optical computing system that completes convolution computation only as a multiplier-adder, the on-chip optical computing chip can implement complex optical computing such as Fourier transform, convolution, and autocorrelation.

Figure 7:
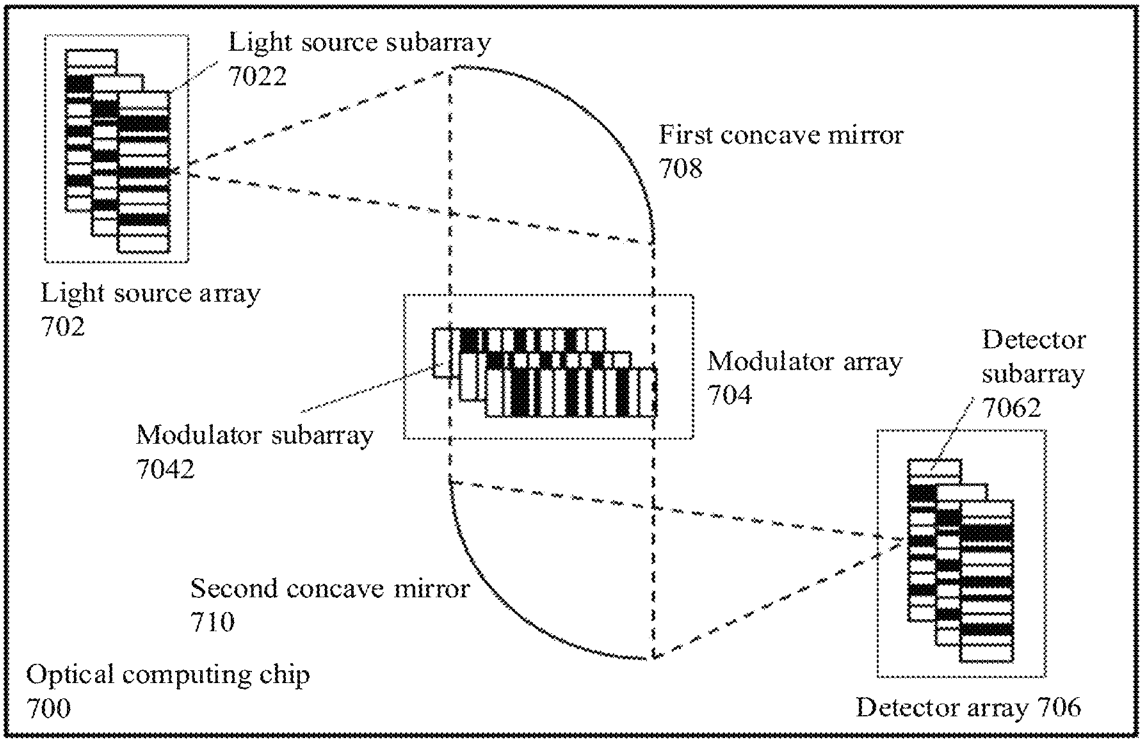
FIG. 7 is a schematic structural diagram of another optical computing chip according to an embodiment of the present disclosure.

In the optical computing chips described in FIG. 2 and FIG. 6, a one-layer chip structure is used as an example. It may be understood that, due to a physical implementation limitation, only a one-dimensional light source array and a one-dimensional detector array can be implemented on a one-layer chip. Therefore, the optical computing chips described in FIG. 2 and FIG. 6 are one-dimensional convolution computing systems, and can implement convolution computation of one-dimensional data. In another possible implementation, an embodiment of the present disclosure provides an optical computing chip that can implement multi-dimensional data computation. Further, a plurality of one-layer light source arrays may be stacked to implement a multi-dimensional light source array (for example, a two-dimensional light source array), a plurality of one-dimensional modulator arrays may be stacked to implement a multi-dimensional modulator array, and a plurality of one-dimensional detector arrays may be stacked to implement a multi-dimensional detector array. In addition, multi-dimensional convolution computation can be implemented by increasing an area of a concave mirror. As shown in FIG. 7, the optical computing chip shown in FIG. 7 may include a light source array 702, a modulator array 704, a detector array 706, a first concave mirror 708, and a second concave mirror 710. Relative positions of the foregoing components may be shown in FIG. 2 and FIG. 6. A difference from the optical computing chips shown in FIG. 2 and FIG. 6 is as follows. In the optical computing chip shown in FIG. 7, the light source array 702 may include a plurality of stacked light source subarrays 7022, the modulator array 704 may include a plurality of stacked modulator subarrays 7042, and the detector array 706 may include a plurality of stacked detector subarrays 7062. Structures and operating principles of the light source subarray 7022, the modulator subarray 7042, and the detector subarray 7062 may be respectively shown in the light source array 202, the modulator array 204, and the detector array 206 in FIG. 2.

In an actual application, one light source subarray 7022, one modulator subarray 7042, and one detector subarray 7062 cooperate to process one row of data in first data and one row of data in second data, to implement the function shown in FIG. 2 or FIG. 6. For example, one light source subarray 7022 may be configured to generate a first optical subsignal based on the first row of data in the first data, and generate a second optical subsignal based on the first row of data in the second data. One modulator subarray 7042 is configured to record and modulate a reflected optical signal based on the first optical subsignal and the second optical subsignal. One detector subarray 7062 is configured to detect a computation result of the first row of data in the first data and the first row of data in the second data. It may be understood that in comparison with the optical computing chip shown in FIG. 2, because both the light source array 702 and the modulator array 704 are formed by stacking a plurality of subarrays, in the optical computing chip shown in FIG. 7, thicknesses of the first concave mirror 708 and the second concave mirror 710 are increased relative to thicknesses of the first concave mirror 208 and the second concave mirror 210 in FIG. 2. Therefore, optical signals emitted by the light source array 702 and the modulator array 704 can be reflected. It may be understood that because the optical computing chip shown in FIG. 7 may include a plurality of stacked light source subarrays, a plurality of stacked modulator subarrays, and a plurality of stacked detector subarrays, convolution computation of multi-dimensional data (or multi-row and multi-column data) can be implemented.

Figure 8:
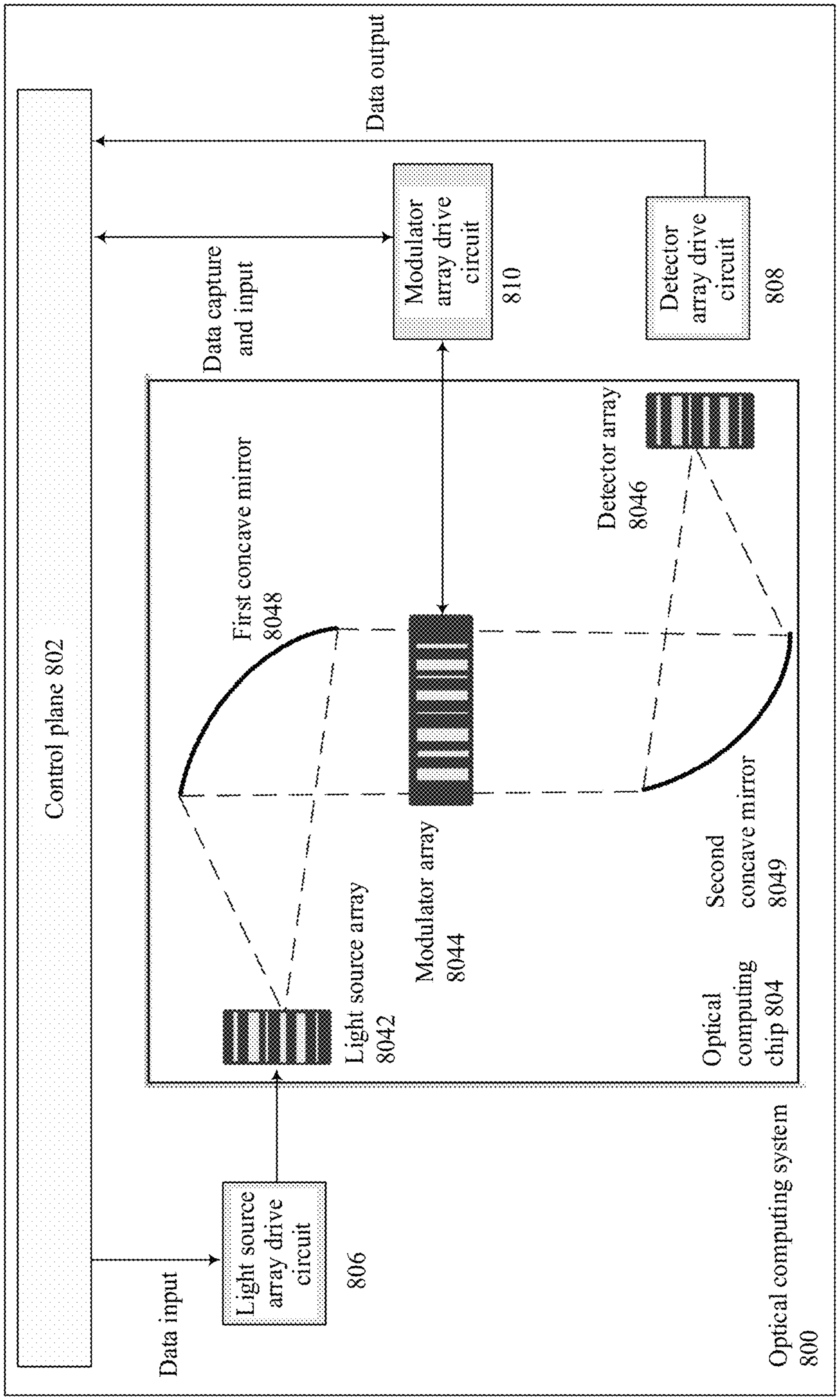
FIG. 8 is a schematic structural diagram of an optical computing system according to an embodiment of the present disclosure.

A person skilled in the art may know that in an actual application, the optical computing chip needs to cooperate with another auxiliary circuit to implement optical computing. FIG. 8 is a schematic structural diagram of an optical computing system according to an embodiment of the present disclosure. As shown in FIG. 8, the optical computing system 800 mainly includes three parts: a control plane 802, an optical computing chip 804, and a peripheral drive circuit. The peripheral drive circuit may include a light source array drive circuit 806, a modulator array drive circuit 810, and a detector array drive circuit 808. In an actual application, the control plane 802 may include a component that can implement functions such as control and processing, such as a processor. For example, the control plane 802 may include a processing component such as a CPU, an application-specific integrated circuit (ASIC), or a field-programmable gate array (FPGA). This is not limited herein. The optical computing chip 804 may be shown in FIG. 2, FIG. 6, or FIG. 7. For example, the optical computing chip 804 may include a light source array 8042, a modulator array 8044, a detector array 8046, a first concave mirror 8048, and a second concave mirror 8049. For specific implementation of the optical computing chip 804, refer to the description in the foregoing embodiment.

The light source array 8042, the modulator array 8044, and the detector array 8046 in the optical computing chip 804 are active components, and therefore need to be driven by corresponding external drive circuits. Therefore, the optical computing system 800 may further include peripheral circuits such as the light source array drive circuit 806, the modulator array drive circuit 810, and the detector array drive circuit 808. The following briefly describes the peripheral circuits in the optical computing system with reference to the foregoing process of implementing convolution computation on the first data and the second data.

Figure 9:
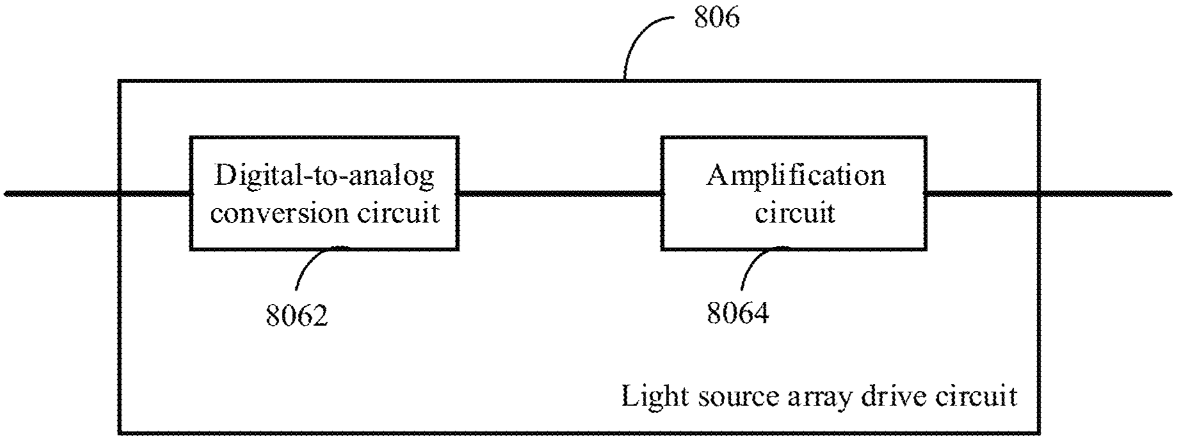
FIG. 9 is a schematic structural diagram of a light source array drive circuit according to an embodiment of the present disclosure.

The light source array drive circuit 806 is configured to receive to-be-computed data sent by the control plane 802, and convert the received data into a corresponding voltage, to drive the light source array 8042 to emit a corresponding optical signal. For example, the light source array drive circuit 806 may receive the first data and the second data that are sent by the control plane 802, and convert the first data and the second data into corresponding voltages. In an actual application, as shown in FIG. 9, the light source array drive circuit 806 may include a digital-to-analog conversion circuit 8062 and an amplification circuit 8064. Using reception of the first data as an example, the digital-to-analog conversion circuit 8062 in the light source array drive circuit 806 may perform digital-to-analog conversion on the received first data, and convert the first data into a corresponding voltage. Then the amplification circuit 8064 amplifies the voltage obtained through the conversion, and sends a corresponding amplified voltage to the light source array 8042, to drive the light source array 8042 to convert a received electrical signal into a corresponding optical signal, thereby converting the first data into a first optical signal.

Figure 10:
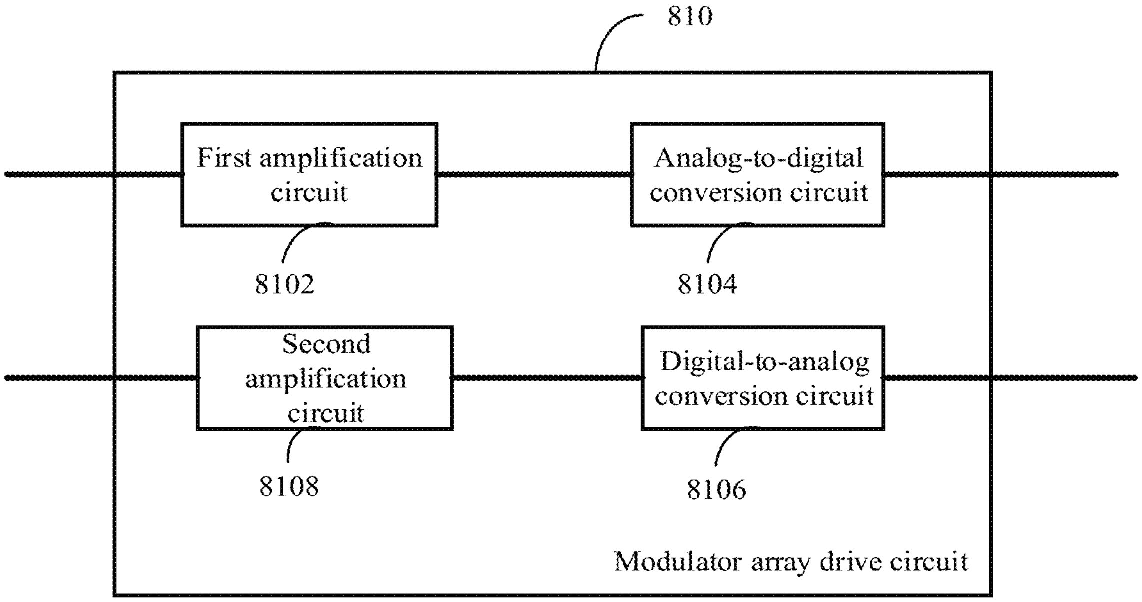
FIG. 10 is a schematic structural diagram of a modulator array drive circuit according to an embodiment of the present disclosure.

As described above, the modulator array provided in this embodiment of the present disclosure has two working modes: recording and modulation. Therefore, there is a bidirectional data exchange process between the modulator array 8044 and the modulator array drive circuit 810 in the optical computing chip 804. Further, as shown in FIG. 10, the modulator array drive circuit 810 may include a first amplification circuit 8102, an analog-to-digital conversion circuit 8104, a digital-to-analog conversion circuit 8106, and a second amplification circuit 8108. When the modulator array 8044 works in the recording mode, after receiving a first reflected optical signal from the first concave mirror 8048, the modulator array 8044 generates a corresponding photocurrent. The modulator array drive circuit 810 may capture the photocurrent generated by the modulator array 8044. The photocurrent generated by the modulator array 8044 based on the received first reflected optical signal is used to indicate spectrum plane distribution data of the first reflected optical signal. After the first amplification circuit 8102 in the modulator array drive circuit 810 amplifies the received photocurrent, the analog-to-digital conversion circuit 8104 converts the amplified photocurrent into data, to obtain the spectrum plane distribution data of the first reflected optical signal. In other words, after converting the received photocurrent into a digital signal, the analog-to-digital conversion circuit 8104 may record the spectrum plane distribution data of the first reflected optical signal. After obtaining the spectrum plane distribution data of the first reflected optical signal, the modulator array drive circuit 810 may send the spectrum plane distribution data of the first reflected optical signal to the control plane 802. The control plane 802 performs processing such as denoising, normalization, or format conversion on the spectrum plane distribution data of the received first reflected optical signal, and then sends processed data to the modulator array drive circuit 810. The digital-to-analog conversion circuit 8106 in the modulator array drive circuit 810 may receive the processed data sent by the control plane 802, and convert the received data into a corresponding analog signal. The second amplification circuit 8108 inputs a corresponding voltage (or a modulation signal) to the modulator array based on the converted analog signal, to drive the modulator array 8044 to work in the modulation mode and modulate corresponding data onto the modulator array 8044. In an actual application, the first amplification circuit 8102 and the second amplification circuit 8108 may also be implemented by using one circuit, and the analog-to-digital conversion circuit 8104 and the digital-to-analog conversion circuit 8106 may also be integrated.

Figure 11:
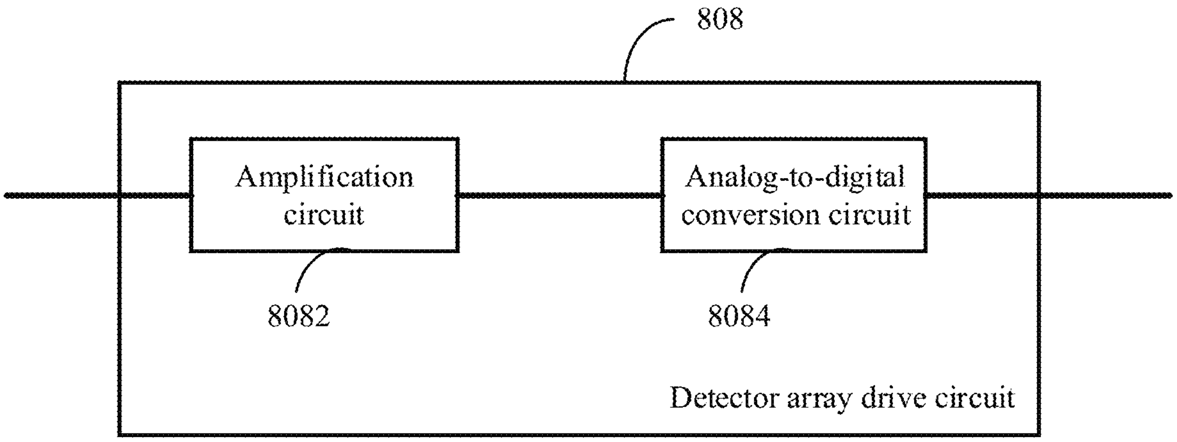
FIG. 11 is a schematic structural diagram of a detector array drive circuit according to an embodiment of the present disclosure.

As shown in FIG. 11, the detector array drive circuit 808 may also include an amplification circuit 8082 and an analog-to-digital conversion circuit 8084. The detector array drive circuit 808 is configured to receive a light intensity signal detected by the detector array 8046. It may be understood that the light intensity signal detected by the detector array 8046 is in a form of a photocurrent. In an actual application, the amplification circuit 8082 may amplify a received photocurrent signal detected by the detector array 8046. Then the analog-to-digital conversion circuit 8084 in the detector array drive circuit 808 may convert the received analog signal into a digital signal, to obtain a computation result of the first data and the second data, and may send the computation result to the control plane 802.

As can be learned from the foregoing description of the optical computing system 800, a data input of the entire optical computing system 800 may be implemented by driving the light source array 8042 by the control plane 802 by using the light source array drive circuit 806, the computation result of the optical computing chip 804 may be captured by the detector array drive circuit 808, and finally, the captured data is returned to the control plane 802.

It may be understood that the described apparatus embodiment is merely an example. For example, the division into the modules is merely logical function division, and another division manner may be used in actual implementation. For example, a plurality of modules or components may be combined or integrated into another system, or some features may be ignored or may not be performed. In addition, the modules discussed in the foregoing embodiments may be connected to each other in electrical, mechanical, or other forms. The modules described as separate components may or may not be physically separate. A component displayed as a module may or may not be a physical module. In addition, functional modules in the embodiments of this application may exist independently, or may be integrated into one processing module.

An embodiment of the present disclosure further provides a computer program product for data processing, including a computer-readable storage medium storing program code, where instructions included in the program code are used to perform the method process described in any one of the foregoing method embodiments. A person of ordinary skill in the art may understand that the foregoing storage medium may include any non-transitory machine-readable medium capable of storing program code, such as a Universal Serial Bus (USB) flash drive, a removable hard disk, a magnetic disk, an optical disc, a random-access memory (RAM), a solid-state drive (SSD), or a non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, refer to related descriptions of another embodiment. The features disclosed in the embodiments of the present disclosure, claims, and the accompanying drawings may exist independently or exist in a combination. Features described in a hardware form in the embodiments of the present disclosure may be executed by software, and vice versa. This is not limited herein.

What is claimed is:

1. An optical computing chip, comprising:
a first concave mirror configured to output a first reflected optical signal based on a first optical signal;
a light source array located on a first objective focal plane of the first concave mirror and configured to generate the first optical signal based on first data; and
a modulator array located on a first image focal plane of the first concave mirror and comprising a plurality of modulators, wherein the modulators are arranged along a straight line, and wherein the modulator array is configured to:
receive the first reflected optical signal;
obtain first spectrum plane distribution data based on the first reflected optical signal by:
applying a forward voltage to the modulators; and
generating a photocurrent in each of the modulators based on intensity of the first reflected optical signal received by that modulator, wherein a transmittance of each of the modulators for the first reflected optical signal indicates a value in the first spectrum plane distribution data;
receive a first modulation signal that is based on the first spectrum plane distribution data; and
modulate, based on the first modulation signal and by applying a reverse bias voltage to the modulators, the first spectrum plane distribution data by changing light intensity of the first reflected optical signal to obtain a modulated optical signal, wherein each of the modulators receives and modulates a portion of the first reflected optical signal, and wherein each portion of the first reflected optical signal passes through and is modulated by only one of the modulators.

2. The optical computing chip of claim 1, wherein the light source array is further configured to generate a second optical signal based on second data, wherein the first concave mirror is further configured to output a second reflected optical signal based on the second optical signal, and wherein the modulator array is further configured to obtain a third optical signal based on the second reflected optical signal and the first spectrum plane distribution data.

3. The optical computing chip of claim 2, further comprising:
a second concave mirror, wherein the modulator array is further located on a second objective focal plane of the second concave mirror, and wherein the second concave mirror is configured to:
receive the third optical signal; and
output a third reflected optical signal based on the third optical signal; and
a detector array located on a second image focal plane of the second concave mirror and configured to detect the third reflected optical signal, wherein distribution of the third reflected optical signal on the detector array indicates a convolution result of the first data and the second data.

4. The optical computing chip of claim 1, wherein the modulators comprise a semiconductor optical amplifier (SOA).

5. The optical computing chip of claim 1, wherein the light source array comprises a plurality of light emitting elements, and wherein each of the light emitting elements is configured to generate incoherent light.

6. The optical computing chip of claim 3, further comprising four peripheral sides, wherein the light source array and the detector array are located on a same one of the four peripheral sides.

7. The optical computing chip of claim 3, wherein the first concave mirror and the second concave mirror are parabolic concave mirrors.

8. The optical computing chip of claim 3, wherein the light source array comprises a plurality of stacked light source subarrays, wherein the modulator array comprises a plurality of stacked modulator subarrays, and wherein the detector array comprises a plurality of stacked detector subarrays.

9. An optical computing system comprising:
an optical computing chip comprising:
a first concave mirror configured to output a first reflected optical signal based on a first optical signal;
a light source array located on a first objective focal plane of the first concave mirror and configured to generate the first optical signal based on first data;
a modulator array located on a first image focal plane of the first concave mirror and comprising a plurality of modulators, wherein the modulators are arranged along a straight line, and wherein the modulator array is configured to:
receive the first reflected optical signal;
obtain first spectrum plane distribution data based on the first reflected optical signal by:
applying a forward voltage to the modulators; and
generating a photocurrent in each of the modulators based on intensity of the first reflected optical signal received by that modulator, wherein a transmittance of each of the modulators for the first reflected optical signal indicates a value in the first spectrum plane distribution data;
receive a first modulation signal that is based on the first spectrum plane distribution data; and
modulate, based on the first modulation signal and by applying a reverse bias voltage to the modulators, the first spectrum plane distribution data by changing light intensity of the first reflected optical signal to obtain a modulated optical signal, wherein each of the modulators receives and modulates a portion of the first reflected optical signal, and wherein each portion of the first reflected optical signal passes through and is modulated by only one of the modulators; and
a processor coupled to the optical computing chip and configured to input the first data to the optical computing chip.

10. The optical computing system of claim 9, further comprising:
a light source array drive circuit coupled to the processor and the light source array and configured to apply a first drive signal to the light source array based on the first data; and
a modulator array drive circuit coupled to the modulator array and configured to:
sample the first spectrum plane distribution data; and
apply the first modulation signal to the optical computing chip based on the first spectrum plane distribution data, wherein the light source array is further configured to further generate the first optical signal based on the first drive signal, and wherein the modulator array is further configured to further modulate the first spectrum plane distribution data based on the first modulation signal.

11. The optical computing system of claim 10, wherein the processor is further configured to send second data, wherein the light source array drive circuit is further configured to generate a second drive signal based on the second data, wherein the light source array is further configured to generate, based on the second drive signal, a second optical signal corresponding to the second data, wherein the first concave mirror is further configured to output a second reflected optical signal based on the second optical signal, and wherein the modulator array is further configured to obtain a third optical signal based on the second reflected optical signal and the first spectrum plane distribution data.

12. The optical computing system of claim 11, wherein the optical computing chip further comprises:

a second concave mirror, wherein the modulator array is further located on a second objective focal plane of the second concave mirror, and wherein the second concave mirror is configured to:

receive the third optical signal; and output a third reflected optical signal based on the third optical signal; and a detector array located on a second image focal plane of the second concave mirror and configured to detect the third reflected optical signal, wherein distribution of the third reflected optical signal on the detector array indicates a convolution result of the first data and the second data.

13. The optical computing system of claim 12, further comprising a detector array drive circuit coupled to the detector array and configured to:

capture the third reflected optical signal from the detector array; and perform analog-to-digital conversion on the third reflected optical signal to obtain the convolution result.

14. The optical computing system of claim 9, wherein the modulators comprise a semiconductor optical amplifier (SOA).

15. The optical computing system of claim 9, wherein the light source array comprises a plurality of light emitting elements, and wherein each of the light emitting elements is configured to generate incoherent light.

16. The optical computing system of claim 12, wherein the optical computing chip further comprises four peripheral sides, and wherein the light source array and the detector array are located on a same one of the four peripheral sides.

17. The optical computing system of claim 12, wherein the first concave mirror and the second concave mirror are parabolic concave mirrors.

18. The optical computing system of claim 12, wherein the light source array comprises a plurality of stacked light source subarrays, wherein the modulator array comprises a plurality of stacked modulator subarrays, and wherein the detector array comprises a plurality of stacked detector subarrays.

19. A data processing method implemented by an optical computing chip, wherein the data processing method comprises:

generating, by a light source array of the optical computing chip, a first optical signal based on first data, wherein the light source array is located on a first objective focal plane of a first concave mirror of the optical computing chip;

outputting, by the first concave mirror, a first reflected optical signal based on the first optical signal;

obtaining, by a modulator array of the optical computing chip, first spectrum plane distribution data based on the first reflected optical signal by:

applying a forward voltage to a plurality of modulators of the modulator array; and generating a photocurrent in each of the modulators based on intensity of the first reflected optical signal received by that modulator, wherein the modulator array is located on a first image focal plane of the first concave mirror, wherein the modulators are arranged along a straight line, and wherein a transmittance of each of the modulators for the first reflected optical signal indicates a value in the first spectrum plane distribution data;

receiving a first modulation signal that is based on the first spectrum plane distribution data; and modulating, based on the first modulation signal and by applying a reverse bias voltage to the modulators, the first spectrum plane distribution data by changing light intensity of the first reflected optical signal to obtain a modulated optical signal, wherein each of the modulators receives and modulates a portion of the first reflected optical signal, and wherein each portion of the first reflected optical signal passes through and is modulated by only one of the modulators.

20. The data processing method of claim 19, further comprising:

generating, by the light source array, a second optical signal based on second data;

outputting, by the first concave mirror, a second reflected optical signal based on the second optical signal;

obtaining, by the modulator array, a third optical signal based on the second reflected optical signal and the first spectrum plane distribution data;

outputting, by a second concave mirror of the optical computing chip, a third reflected optical signal based on the third optical signal, wherein the modulator array is further located on a second objective focal plane of the second concave mirror; and detecting, by a detector array of the optical computing chip, the third reflected optical signal, wherein the detector array is located on a second image focal plane of the second concave mirror, and wherein distribution of the third reflected optical signal on the detector array indicates a convolution result of the first data and the second data.

21. The optical computing chip of claim 1, wherein reflective surfaces of the first concave mirror are formed as air reflective surfaces by a deep etching process, and wherein end faces of the first concave mirror are plated with a highly reflective film.

22. The optical computing system of claim 10, wherein the modulator array drive circuit further comprises:

a first amplification circuit configured to amplify the photocurrent generated by the modulator array upon receiving the first reflected optical signal;

an analog-to-digital conversion circuit configured to convert the amplified photocurrent into digital data to obtain the first spectrum plane distribution data;

a digital-to-analog conversion circuit configured to convert the first spectrum plane distribution data into a corresponding analog signal after processing by the processor; and a second amplification circuit configured to apply, based on the analog signal, a corresponding voltage to the modulator array as the first modulation signal.

* * * * *